(12) United States Patent
Kozee et al.

(10) Patent No.: US 8,974,050 B2
(45) Date of Patent: Mar. 10, 2015

(54) METHOD OF PRINTING ON A FILM SUBSTRATE

(75) Inventors: Michael Kozee, Wheaton, IL (US);
Michael Sullivan, Belvidere, IL (US);
Ondrej Kruk, Schaumburg, IL (US);
Linfang Zhu, Woodridge, IL (US)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

(21) Appl. No.: 13/878,543

(22) PCT Filed: Nov. 9, 2011

(86) PCT No.: PCT/US2011/059856
§ 371 (c)(1),
(2), (4) Date: Apr. 9, 2013

(87) PCT Pub. No.: WO2012/064796
PCT Pub. Date: May 18, 2012

(65) Prior Publication Data
US 2013/0189503 A1     Jul. 25, 2013

Related U.S. Application Data

(60) Provisional application No. 61/413,043, filed on Nov. 12, 2010.

(51) Int. Cl.
*B41J 2/01* (2006.01)
*B41J 2/21* (2006.01)
*C09D 11/328* (2014.01)

(52) U.S. Cl.
CPC *B41J 2/01* (2013.01); *B41J 2/2107* (2013.01); *C09D 11/328* (2013.01)
USPC ................................ 347/100; 347/95; 347/101

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC ............. 347/100, 95, 96, 101, 102, 105, 103, 347/88, 99; 106/31.27, 31.13, 31.6; 523/160, 161; 428/32.1, 195
See application file for complete search history.

(56) References Cited

U.S. PATENT DOCUMENTS 5,466,287 A    11/1995   Lyon
5,594,044 A *  1/1997    Yang ............................ 347/100
(Continued)

FOREIGN PATENT DOCUMENTS

WO    2010104846    9/2010

OTHER PUBLICATIONS

Lahti et al., Atmospheric Plasma Treatment of Plastic Packaging Film: Effects on Surface Properties and UV Inkjet Printability, 13th TAPPI European Place Conference, Bregenz, Austria—Session 16—Paper 1, May 30-Jun. 1, 2011.
(Continued)

*Primary Examiner* — Manish S Shah
(74) *Attorney, Agent, or Firm* — Joseph A. Yosick

(57) ABSTRACT

A method for printing images on a substrate with an ink jet printer includes providing a liquid ink composition. The liquid ink composition includes an organic solvent, a binder, and a colorant. Droplets of the ink jet ink composition are directed to a plastic film substrate. The droplets are allowed to dry, thereby printing a durable graphic image on the substrate.

18 Claims, 8 Drawing Sheets

(56) References Cited

U.S. PATENT DOCUMENTS

| | | | |
|---|---|---|---|
| 5,652,286 A | | 7/1997 | Deng |
| 5,755,860 A | | 5/1998 | Zhu |
| 5,889,083 A | * | 3/1999 | Zhu ............................... 523/161 |
| 6,010,564 A | * | 1/2000 | Zhu et al. ...................... 347/100 |
| 6,083,310 A | * | 7/2000 | Peterson et al. ........... 106/31.27 |
| 6,494,943 B1 | | 12/2002 | Yu et al. |
| 6,726,756 B1 | * | 4/2004 | Zou et al. ................... 106/31.37 |
| 6,811,840 B1 | | 11/2004 | Cross |
| 7,309,388 B2 | | 12/2007 | Zhu et al. |
| 2003/0228073 A1 | | 12/2003 | Mark |
| 2004/0154495 A1 | * | 8/2004 | Zhu et al. ..................... 347/100 |
| 2008/0066239 A1 | * | 3/2008 | Zhu et al. ................... 106/31.27 |
| 2010/0187805 A1 | | 7/2010 | Sano et al. |

OTHER PUBLICATIONS

Sun et al., Corona Treatment of Polyolefin Films—A Review, Advances in Polymer Technology, vol. 18, No. 2, 171-180, 1999 Accepted: Jan. 7, 1999.

France et al., Effects of energy transfer from an argon plasma on the surface chemistry of poly(styrene), low density poly(ethylene), poly(propylene) and poly(ethylene terephthalate), J. Chem. Soc., Faraday Trans., 1997, vol. 93.

Wu et al., Novel Microporous Films and Their Composites, Journal of Engineered Fibers and Fabrics http://www.jeffjournal.org vol. 2, Issue 1-2007.

* cited by examiner

METHOD OF PRINTING ON A FILM SUBSTRATE

RELATED APPLICATIONS

This application claims priority under 35 U.S.C. §371 from PCT Application No. PCT/US 2011/059856, filed in English on Nov. 9, 2011, which claims the benefit of U.S. Provisional Application No. 61/413,043 filed Nov. 12, 2010, the disclosures of both of which are incorporated herein by reference in their entireties.

FIELD OF THE INVENTION

The present disclosure relates to a method of printing on a film substrate using ink jet printing.

BACKGROUND OF THE INVENTION

Production web processes are used to fabricate a number of film and sheet products such as personal hygienic articles, disposable bags, napkins, packaging films and other articles. The films used in these processes have various purposes, but producers often perceive an opportunity to decorate the products or otherwise mark them by printing directly onto these plastic surfaces. These plastics are often very tough to print on and often require off-line printing with special auxiliary processes that provide durable printed images. These articles are also often produced on complex continuous production web processes that are designed for maximum production efficiency. Article producers generally prefer to integrate as many portions of the article assembly processes within these production web processes including article printing, but in-line printing methods are difficult to provide due to the problems with attaining good adhesion on these substrates as well as the integration costs associated with modifying existing production lines and the production efficiency losses that would ensue using current printing methods. Hence there is a need for in-line printing methods that can provide printed images on films with easy integration into existing processes and without reduction in production efficiency.

One of the most effective ways to provide in-line printing is via digital ink jet printing. In ink jet printing, printing is accomplished without contact between the printing device and the substrate on which the printed characters are deposited. Briefly described, ink jet printing involves projecting a stream of ink droplets to a surface and controlling the direction of the stream, e.g., electronically, so that the droplets are caused to form the desired printed image on that surface. This technique of noncontact printing is well suited for application of digital content such as variable decorative marks onto a variety of surfaces including porous and non-porous surfaces.

One of the most common forms of ink jet for marking products in production is CIJ (continuous ink jet) that includes both single and array-nozzle printers. CIJ printers can deliver a wide range of ink jet ink formulations that serve various industrial applications. However, current CIJ inks do not have sufficient adhesion to flexible films nor can they pass some of the basic durability requirements for the film industry.

BRIEF SUMMARY OF THE INVENTION

In one aspect, a method for printing images on a substrate with an ink jet printer includes providing a liquid ink composition. The liquid ink composition includes an organic solvent, a binder, and a colorant. Droplets of the ink jet ink composition are directed to a plastic film substrate. The droplets are allowed to dry, thereby printing a durable graphic image on the substrate.

DETAILED DESCRIPTION OF THE INVENTION

Figure 1:
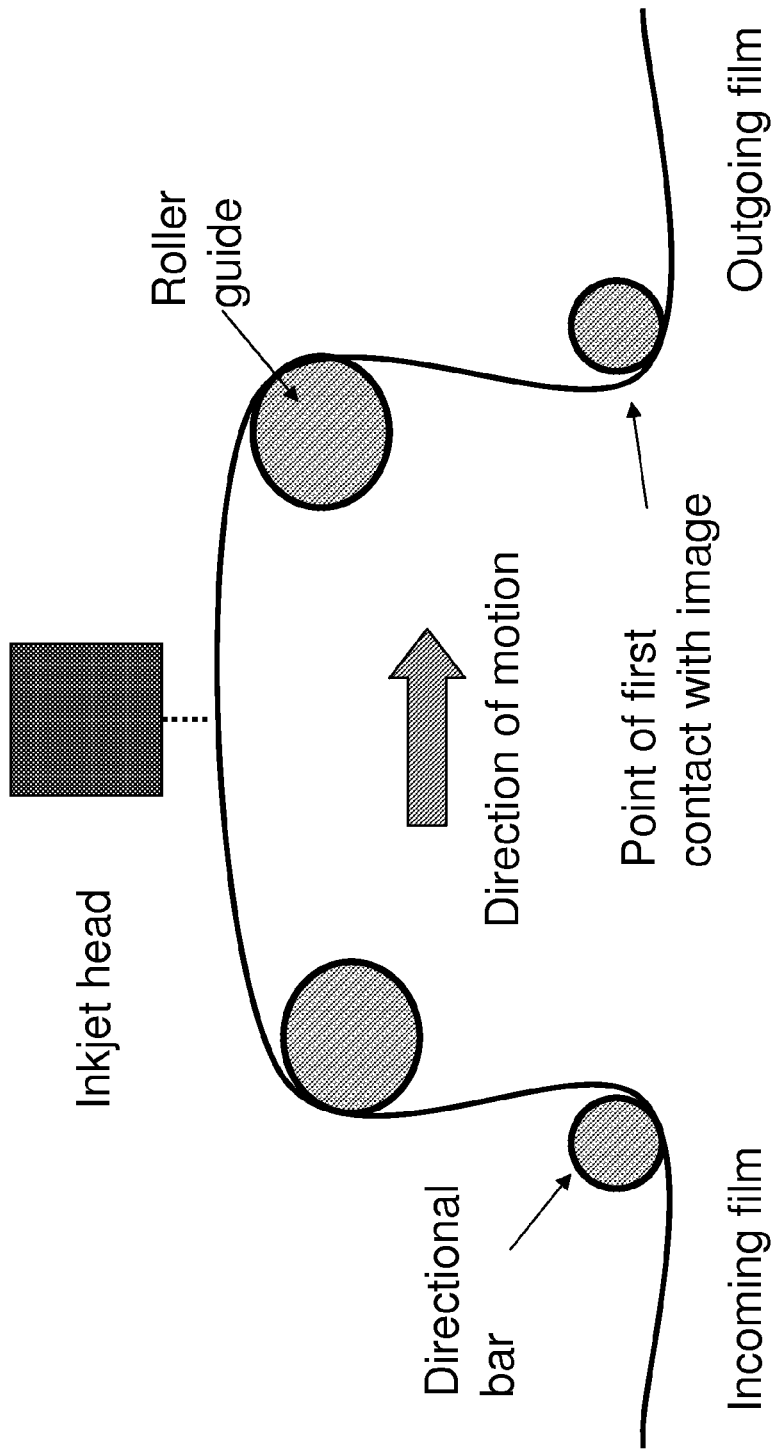
FIG. 1 is a typical arrangement of an ink jet printhead in a roll-to-roll (web) process.

Fabrication methods for producing high value consumer articles with low end-user costs have evolved much in the last few decades. Inexpensive plastic films that are typically blown extruded in large volumes are widely used in these processes. The films may be incorporated into products such as personal hygienic articles, disposable bags, napkins, packaging films and other articles. The films serve various purposes within the articles. For example, the films might form the article itself, as is the case with disposable trash bags. The films may form a structural support for the article or even further serve as a functional barrier layer such as the backsheet in a diaper or the film packaging used to cover the front of packaged meat.

Generally, the films are highly visible within the constructs of these articles and hence producers wish to print onto regions of the films to enhance their salability, safety or usefulness, thereby adding value to the products. A producer may wish to print onto a visible region a graphic image such as a company trademark, a logo, or another graphic to portray the brand. Graphics might be printed to simply decorate the item or provide product differentiation. Other purposes for printing might be to provide functional or beneficial information to the end-use of the item, such as a born-on-date or instructions for use. A specific example of the latter is the messages that are currently printed onto garbage bags that provide a warning to the customer that the bags are a suffocation hazard.

Many of these articles are produced on high production efficiency continuous webs. A series of feed-lines provide the raw materials (sometimes in the form of a roll) to various stations along an assembly line that includes rollers and guides that carry the material. The stations have various purposes such as bonding two or more raw materials, manipulating the article construct (i.e., folding, etc.), assembling the article (gluing, etc.) and printing. For increasing overall production efficiency and eliminating or reducing inventories of various pre-printed stocks, producers generally prefer in-line processes to off-line processes. In addition, off-line printed often requires finely engineered solutions to provide registration of the pre-printed marks so that they appear at the precise desired location on the final produced good. An in-line printing process is one that is defined here as printing occurring on the production line where final articles are constructed and/or packaged. The specific details of an in-line process may be different for different articles. For example, a trash bag might be extruded and packaged in the same process and this would be considered an in-line process. A diaper would most likely be assembled from film extruded in an off-line process but the in-line printing on the film, if performed, would be done on the production line where the diaper is constructed and packaged.

Providing in-line printing processes are often difficult, however. There are substantial costs to incorporate printers in-line due to the large physical space required by the printer. The most commonly used printers are flexographic printers which can occupy a sizeable footprint on-line. Secondly, commonly employed flexographic printers are sometimes difficult to use with moving webs as the printer must 'arrest' the travelling plastic film and apply pressure to transfer the ink. This can lead to severe limitation on upper line speed and/or kinds of substrates that can be efficiently printed. Since these kinds of printers are directly attached to the line, they will negatively impact production efficiency if they fail as there are no readily available back-ups. Also, energy assisted drying would typically need to be employed to ensure that the printed images do not smear at the typical minimum linear production speeds of 500 meters per minute increasing integration complexity. Finally, solvent VOC emissions from flexographic printers can often be sizable as the ink that is recovered from the process presents a high surface area and is easily volatilized.

Ink jet printing in general is a good solution to many of the above mentioned issues. It generally has a limited footprint on-line and is a non-contact method so the substrate can pass unimpeded underneath the printhead. A suitable printing station for ink jet printing may simply include two leveling rollers or guides that stabilize the substrate beneath the printhead as it passes, as shown in FIG. 1. Backup print heads may be easily incorporated into an ink jet system to effectively keep the production line running even when the primary print head may fail. Emissions from ink jet printers can be generally low given the lower overall exposure of ink to the atmosphere so that very limited engineering controls are necessary to control them as opposed to contact printing methods.

Continuous ink jet (CIJ) is a form of ink jet that is highly amenable to printing onto films in these production environments. Like other forms of inkjet, CIJ can be introduced into a line with a minimal footprint. CIJ printers most often operate on the theory of selectively charging and deflecting drops in flight. Drops are continuously generated at the nozzle by inducing break-off from a pressurized continuous stream of ink in the presence of a variable electrostatic field created by a charging electrode that places a discrete charge on selected drops. Drops subsequently pass through an electrostatic field wherein the field potential induces deflection on the charged drops in order to direct them to print or direct them into an ink catcher to be reused in the ink system. With this mechanism, CIJ generally possesses an advantage over other ink jet forms, in that when the printer nozzles are obstructed, the printer will detect the loss of nozzles or jet skews as an electrical fault and the process can be stopped to recover the printer. This same mechanism is often used in binary array CIJ printing which is a type of inkjet that includes an array of jets and that can print at relatively high resolutions of at least 128 by 128 dots per inch (dpi). Because a high number of drops are generated by this mechanism, much higher vertical (along the direction of the nozzle array) and horizontal resolutions (along the direction of substrate motion) as well as high print image height (typically up to 2 inches) are achievable at high line speed.

Because CIJ drops are generated from the stream under relatively high pressures (20 to 80 psi), they have high momentum and the printhead may be positioned further from the printed web (in some cases up to about 0.5 inches away) than is typical for other types of ink jet printing. This allows the delivery of the printed image even under conditions where at high line speeds the substrate may waver or flex laterally toward the printhead. As mentioned previously, to sustain the production rates that current web based manufacturers use, the ink jet printer is desirably able to print with sufficient resolutions at speeds sometimes in excess of 500, 600, or 700 meters per minute. CIJ binary array printers can easily print on substrates moving at this rate. CIJ printers are also capable of jetting ink compositions based on a wide range of solvents and binders. Hence, fast drying solvents can be used so that energy assist drying devices are not required. All of these aspects of CIJ and binary array make these ink jet printing methods particularly suitable for printing onto webs.

Typical materials for the films used in the printing method described herein can exhibit very low surface energies as produced, and include polyethylene (PE), low density polyethylene (LDPE), linear low density polyethylene (LLDPE), very low density polyethylene (VLDPE), polypropylene (PP), biaxially oriented polypropylene (BOPP), high density polyethylene (HDPE), polyethylene terephthalate (PET), polyvinyl chloride (PVC), ethylene vinyl acetate (EVA), ethylene alkyl acrylates (EAA), and styrenic elastomers. Other suitable film materials include cellulose and nylon. Polyolefin such as LLDPE, PE, EVA, PP and VLDPE typically used in the production of disposable bags or hygienic articles are particularly difficult to achieve good adhesion on with typical ink jet inks. The desired films may include multiple bonded or coextruded plastic layers. They may be monolithic films, microporous (breathable) films, apertured or elastomeric films. In general, a film are defined here as any flexible plastic material with a thickness lower than 250 micron and a basis weight of less than 50 grams per square meter. Additionally, these films are essentially non-porous or can exhibit regular pores embedded within at least one of the layers of the films' construct that exhibit further diameters lower than 1 micron. The films may include inorganic fillers or other materials such as slip agents, antioxidants, or plasticizers.

Suitable adhesion to plastic films with printing inks is conventionally often achieved by the use of energetic surface pre-treatments such as flame or plasma treatments. In fact, with conventional water-based ink jet, surface treatment is the best practical way to achieve proper wetting on these kinds of films. Plasma or corona treatment is often the preferred treatment method as it can be rapidly modulated. These treatments can promote the adhesion of ink to polyolefin films mainly by oxidizing the film surface thereby incorporating higher levels of covalently-bound surface oxygen. LDPE and PP are particularly difficult to treat in this way to enhance the adhesion of printed inks. Also, it is believed that slip agents (e.g., fatty acid amides, etc.), antioxidants (e.g., long chain aliphatic thioesters), or plasticizers (e.g., phthalates, etc.) can migrate to the surface during or after film production making it difficult for inks to adhere. The migration of these additives makes surface treatment even more important to achieve consistently good adhesion on these films. Attempting to print on films of various ages without retreating the surface can lead to reduced adhesion in conventional printing techniques.

Thus, another major limitation of typical ink jet printing systems, especially those employing water based inks, is that their ink adhesion to typical plastic films is inferior to that which can be obtained with flexo. Unfortunately, surface treatment processes cannot easily be incorporated in-line to help solve these issues again for the previously cited reasons of cost and integration complexity. The ink jet formulations of the present disclosure overcome some of these issues. They are particularly suitable for films that are based on low-surface energy extruded plastic films. They further provide superior durability and abrasion resistance on low-surface energy plastic films without the need to pre-treat the films using physical methods such as corona, plasma, flame, thermal, UV, chemical etching, abrasion or other treatments. The ink compositions, hence, enable efficient in-line production printing of durable graphics onto treated or untreated film-based articles, particularly disposable plastic bags. The ink compositions further enable the use of continuous ink jet—including binary array—printing in these processes. The resulting printed images have a dry time without energy assistance of less than 4 seconds and preferably less than 2 seconds or even more preferably in less than 1 second. Even faster drying rates can be achieved by using air streams directed at the printed images or by as a last resort using energy assisted curing such as infrared lamps.

Article producers expect a high level of durability to protect the printed graphics, particularly their brand images. Surprisingly, printing onto untreated films employing inks of the present method provides printed graphic images that are more durable than images printed with current ink jet inks or even some conventional packaging inks, achieving acceptable adhesion for this application. Adhesion or durability can be tested by rubbing with a thumb for 10 or more times with approximately 1 kg of applied pressure, or similarly scratching with a hard object such as a fingernail. More surprisingly, images printed with the ink compositions disclosed herein onto, for example, garbage bags are sufficiently durable to essentially not be removed within a reasonable number of abrasion cycles (such as greater than 50) either by rubs or scratches. Damage to the substrate occurs prior to removal of the images printed using the method disclosed herein. Thus, the graphic image has a durability such that when the graphic image is subjected to thumb rubs, the force or the number of thumb rubs will first cause damage to the plastic film prior to causing visible print quality degradation as a result of ink removal. There is preferably no visible degradation in appearance of the graphic image after performing at least 10, 25, 50, or 75 thumb rubs. Even more surprisingly, the printed marks are very flexible and pass these tests even after the printed substrate is distorted to its maximum flexible angle (i.e., crumpled together).

Another method to test for abrasion resistance is to perform a crock test using a crock meter such as the Crockmaster model which is generally available from James H. Heal and Company. To perform the crock test on a flexible film while not damaging the substrate itself, the supplemental weight of the crock meter is removed from the crock meter and, before testing, the printed substrate is secured well to the crock meter base using tape. A standard cotton material is used to apply pressure to the film substrate and after performing 50 rubs, the printed image on the film substrate shows little or no signs of wear. Thus, the graphic image has a durability such that the there is no visible degradation in appearance of the graphic image after performing at least 25, 50, or 75 rubs using a crock meter.

Figure 3A:
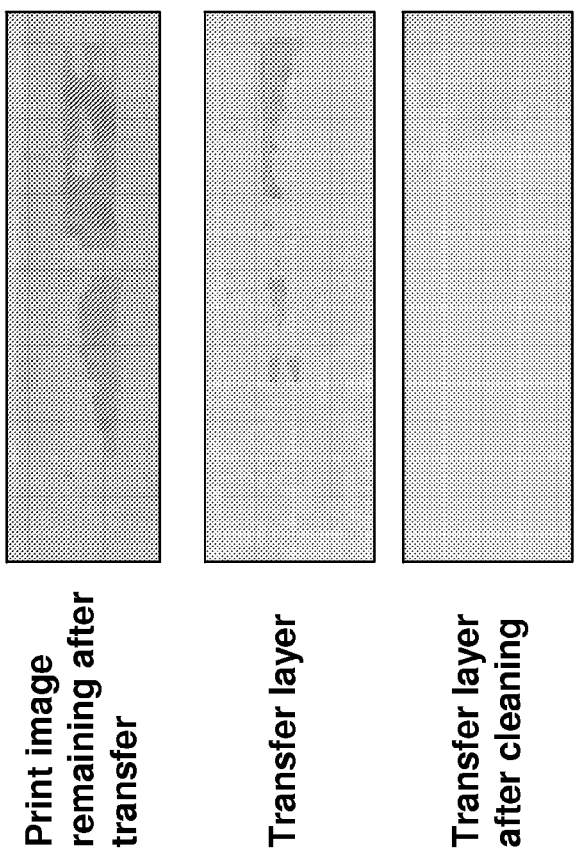
FIG. 3A is shows CIJ printed images for Example 1 and the transfer layer after transfer testing.
Figure 3B:
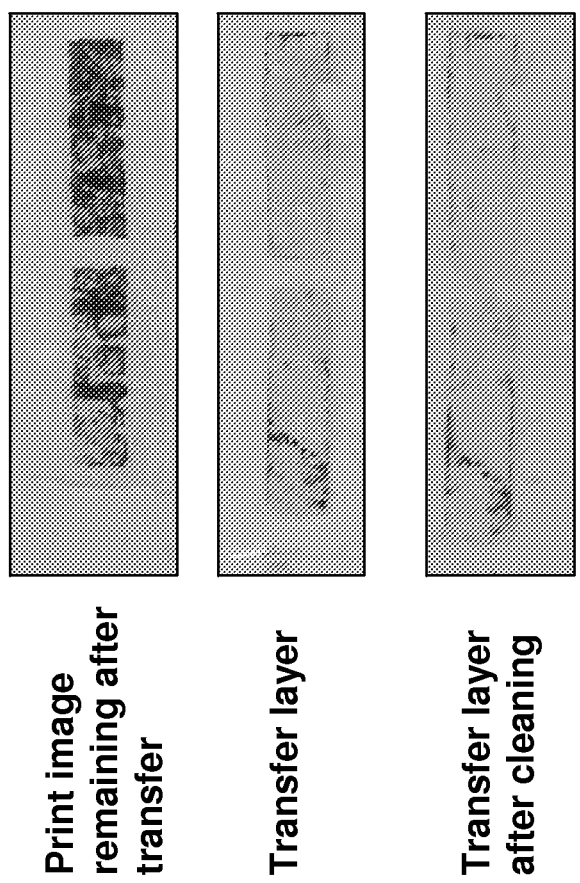
FIG. 3B shows CIJ printed images for Comparative Example 1 and the transfer layer after transfer testing.
Figure 3C:
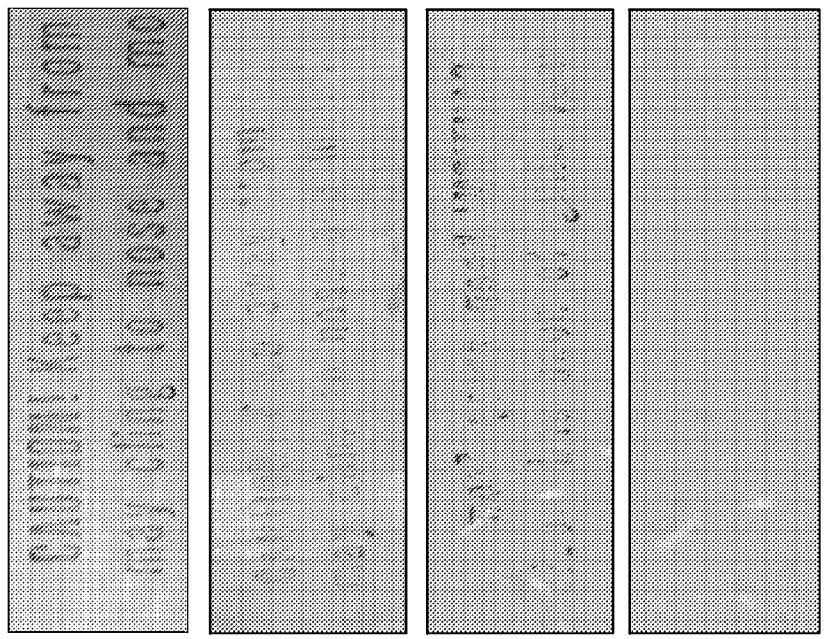
FIG. 3C shows CIJ printed images for Comparative Example 2 and the transfer layer after transfer testing

Additionally, the ink compositions herein exhibit a reduced degree of ink transfer. Ink transfer can be tested by printing onto a film and then subjecting that film to a transfer layer under prescribed conditions. For example, a possible exposure scenario would be where the end-user uses a water-based cleaner after which he allows the printed ink to come in contact with the cleaners against a secondary surface. The printed images of the present disclosure will resist transfer to the secondary surface after such exposure. In addition, the ink may be formulated such that any part of the printed image that happens to transfer in such instances does not penetration into the contacting surface, thus preventing permanent damage. The most common contacting surfaces are PVC or PVC copolymers such as those used for flooring materials. PVC is also considered a worst case as it is typically very receptive to organic solvent based inks. This behavior is depicted in FIG. 3A, which shows the typical level of transfer under these test conditions. FIG. 3B shows the level of transfer onto the PVC transfer layer. FIG. 3C shows that even though the ink has transferred, the transferred ink is completely removed from the PVC surface by either dry towel wiping or by using a common cleaner (Formula 409™).

The ink composition includes an organic solvent, a colorant, and one or more binder resins. In a preferred embodiment, the ink composition includes an organic solvent, a colorant, and a first thermoplastic polymer with a molecular weight less than 6,000 Daltons as defined by the number average molecular weight ($M_n$). The first polymer preferably has relatively low solubility in both ethanol and water.

Preferred first polymers include polysiloxanes, acrylics, rosin esters, and mixtures thereof. These exhibit some alcohol compatibility but are relatively water and alcohol insoluble compared with other low molecular weight resin classes. The polysiloxanes may be mixed methylsiloxane/phenylsiloxane copolymers such as those available from Dow Corning under the trade name Dow Coming® 233.

Rosin esters are suitable as first polymers in that they are typically very low molecular weight with a narrow molecular weight distribution. Fully hydrogenated rosin esters are most suitable. A particularly suitable example is Superester A-75 available from Arakawa Chemical. More than one first polymer can be used in the ink composition.

Acrylic resins suitable as first polymers may be homopolymers or incorporate two or more monomers with or without specific functional groups. Functionalized acrylic resins may be derived from an alkyl-type monomer such as a methacrylate plus a functionalized monomer such as acrylic acid or methacrylic acid; basic monomers such as amino acrylates; or neutral functional monomers that contain hydroxyl groups. Any functionalized acrylic is suitable as long as it remains relatively water and alcohol insoluble. Specific preferred acrylic resins are ones with a $M_n$ lower than 6,000 Daltons. Specific examples are the methyl methacrylate copolymers Paraloid DM-55 (from Dow Chemical, Inc.) or Elvacite 4055 or Elvacite 1010 (from Lucite, Inc.), or butyl acrylate polymers such as Acryonal resins like LR8820 (from BASF, Inc.).

The ink composition preferably further includes a secondary polymer different from the first polymer. The secondary polymer includes one or more thermoplastic polymers each of which has a Mn greater than 10,000 Daltons. The secondary polymer is preferably used in an amount less than 12% by weight in the ink composition and more preferably less than 6%. Preferred secondary polymers include acrylics, cellulose esters, nitrocellulose vinyl acetate/vinyl chloride copolymers, and mixtures thereof. More than one second polymer can be used in the ink composition.

Most suitable secondary resins include cellulose esters and nitrocellulose. An example of a cellulose ester is cellulose acetate propionate (CAP) 482-0.5 available from Eastman Chemical, Inc. An example of an acrylic resin suitable as a secondary polymer is Paraloid B-72 which is an ethylene methyl acrylate copolymer with available from Dow Chemical.

The combined first polymer and second polymer may be present in any suitable amount, for example, in an amount from about 0.1% to about 40%, preferably from about 1% to about 30%, and more preferably from about 2% to about 25% of the ink jet ink composition.

The ink colorant may be a single dye or combination of dyes. Any suitable dyes soluble in the ink can be employed. Dyestuffs can be chosen from either naturally occurring (i.e., foodstuff extracts) or synthetic dyes. Suitable general classes of dyes are direct, acid, base, vat, reactive, mordant, and or solvent. Furthermore the selected dyes include those with structures that correspond to (or include the functional groups similar to) the following: polyene, polymethine, napthalimide, diarylmethine, triarylmethine, carbonium, aza-annulenes (phthalocyanines), napthol, nitro/nitroso dyes, azo dyes (mono- or disazo types), carbonyl dyes (anthraquinones, quinones, benzoquinones, indigoids, leucos), sulfur dyes, nigrosine, metal complex dyes, perylene dyes, vegetable dyes, food dyes, polymeric dyes, and fluorescent/optical brighteners.

The most preferred colorants are dyes that are both soluble in the solvent based ink and also exhibit some water solubility. These included solvent soluble dyes and polymeric colorants such as those available under the trade name Millijet, Reactint, or Polytint from Milliken Chemical. Other potentially suitable dyes are ionic dyes such as acid dyes. The most preferred dyes exhibit water solubility of at least 2 grams per liter as well as ketone solubility of at least 5 grams per liter.

Particularly preferred ink compositions include a first polymer, provided at between 3% and 30% by weight of the ink composition; a secondary cellulose ester polymer, provided at between 0.5% and 12% by weight of the ink composition; and, a water soluble colorant.

Any suitable organic solvent or mixture of organic solvents can be used as the ink carrier of the ink composition. Preferably, the primary organic solvent is one that exhibits a low boiling point. Small amounts of high boiling solvents can also be employed in combination with the low boiling solvent. Examples of suitable organic solvents include ketones, such as acetone, methyl ethyl ketone, diethyl ketone, methyl isobutyl ketone, cyclohexanone, and the like; esters such as methyl acetate, ethyl acetate, n-propyl acetate, isopropyl acetate, n-butyl acetate, t-butyl acetate, amyl acetate, methyl lactate, ethyl lactate, n-propyl lactate, isopropyl lactate, n-butyl lactate, methoxy propanol acetate, and the like; alcohols such as methanol, ethanol, n-propanol, isopropanol, n-butanol, t-butanol, n-pentanol, n-hexanol, benzyl alcohol, and the like; diacetone alcohol; glycol ethers or glycol ether acetates such as methoxy propanol, dipropylene gycol methyl ether, propylene glycol propyel ether, propylene glycol butyl ether, tripropylene glycol methyl ether, butylene glycol methyl ether, dibutylene glycol methyl ether, dipropylene gycol methyl ether acetate, propylene glycol propyl ether acetate, propylene glycol butyl ether acetate and the like; and amides, as well as mixtures of two or more of the foregoing. Methyl ethyl ketone and acetone are preferred solvents.

The solvent may be present in any suitable amount, for example, in an amount 60% or more, about 70% or more, about 80% or more, by weight of the ink composition. In an embodiment, the solvent may be present in an amount from 60% to about 95%, preferably from about 70% to about 92%, and most preferably from about 75% to about 90%.

In an embodiment, the organic solvents used include acetone and ethanol. The acetone may be present in an amount between 40% and 99% by weight, preferably between 45% and 55% by weight, and more preferably between 48% and 52% of the ink composition. The ethanol may be present in an amount between 0.1% and 60% by weight, preferably between 30% and 50% by weight, and more preferably between 35% and 45% by weight of the ink composition.

The ink composition preferably includes little or no water. Water is preferably present in an amount less than 5%, more preferably less than 4%, even more preferably less than 2%, and most preferably less than 1% by weight of the ink jet ink composition. The most preferable case is no added water.

The ink jet ink composition preferably has a low solution resistivity, such as within the range of about 20 to about 2000 ohm-cm. The desired resistivity can be achieved by the addition of an ionizable material or conductive agent which acts as a charge carrier in the liquid ink. Examples of such conductive agents include ammonium, alkali, and alkaline earth metal salts such as lithium nitrate, lithium thiocyanate, lithium trifluoromethanesulfonate, potassium bromide, and the like; amine salts such as dimethylamine hydrochloride, and hydroxylamine hydrochloride; tetraalkylammonium salts such as tetrabutylammonium bromide, tetrabutylammonium hexafluorophosphate, tetrabutylammonium thiocyanate, trabutylammonium nitrate, tetrpropylammonium bromide, tetrpropylammonium acetate, tetraphenylphosphonium bromide as well as ammonium acetate. Preferred conductive agents are tetrabutylammonium salts such as tetrabutylammonium hexafluorophosphate.

Any suitable amount of the conductive agents can be used. Normally, a conductive agent content of up to about 5% by weight of the ink composition provides the desired conductivity, typically in a range of about 0.1% to about 2%.

The ink composition may further include one or more additives such as plasticizers, surfactants, adhesion promoters, and mixtures thereof. Plasticizers may be polymeric and may be added in addition to a binder resin present, generally exhibiting molecular weights that are less than 5,000. Examples of suitable plasticizers include phthalate plasticizers, e.g., alkyl benzyl phthalates, butyl benzyl phthalate, dioctyl phthalate, diisobutyl phthalate, dicyclohexyl phthalate, diethyl phthalate, dimethyl isophthalate, dibutyl phthalate, and dimethyl phthalate, esters such as di-(2-ethylhexy)-adipate, diisobutyl adipate, glycerol tribenzoate, sucrose benzoate, dibutyl sebacate, dibutyl maleate, polypropylene glycol dibenzoate, neopentyl glycol dibenzoate, dibutyl sebacate, and tri-n-hexyltrimellitate, phosphates such as tricresyl phosphate, dibutyl phosphate, triethyl citrate, tributyl citrate, acetyl tri-n-butyl citrate, polyurethanes, polyacrylics, lactates, oxidized oils such as epoxidized soybean oil, oxidized linseed oil, and sulfonamide plasticizers such as Plasticizer 8, available from Monsanto Co., St. Louis, Mo., which is n-ethyl o,p-toluene sulfonamide.

In certain embodiments, the plasticizer can be present in an amount from about 0 to about 5.0%, preferably from about 0.1 to about 2.5%, and more preferably from about 0.25 to about 1.0% by weight of the ink composition.

Examples of surfactants include siloxanes, silicones, silanols, polyoxyalkyleneamines, propoxylated (poly(oxypropylene)) diamines, alkyl ether amines, nonyl phenol ethoxylates, ethoxylated fatty amines, quaternized copolymers of vinylpyrrolidone and dimethyl aminoethyl methacrylate, alkoxylated ethylenediamines, polyethylene oxides, polyoxyalkylene polyalkylene polyamines amines, polyoxyalkylene polyalkylene polyimines, alkyl phosphate ethoxylate mixtures, polyoxyalkylene derivatives of propylene glycol, and polyoxyethylated fatty alcohols, or fluorinated surfactants. Examples of a suitable polymeric silicone based surfactant are sold under the trade name Silwet. Examples of fluorinated surfactants include those sold under the trade name Zonyl from Dupont Corporation.

In any of the embodiments, the surfactant additive may be present in an amount from about 0.001 to about 1.0% by weight, preferably from about 0.005 to about 0.5% by weight of the ink jet ink composition.

The ink composition may have any suitable viscosity or surface tension. In embodiments the ink composition has a viscosity in the range of 1 cP to 20 cP, preferably in the range of 2 cP to 7 cP at 25° C. The ink composition preferably has a viscosity of between 2.5 and 6.0 at 25° C. The ink composition preferably has a surface tension from about 20 to about 35 mN/m at 25° C.

EXAMPLES

The following examples further illustrate the invention but should not be construed as in any way as limiting its scope. The Examples particularly illustrate the preparation of an ink composition suitable for use in a continuous ink jet printer, but these could potentially be adapted to inks for use in other kinds of ink jet printers by those skilled in the art. In each case, the ingredients were combined and mixed as appropriate to create a homogeneous ink and the resulting mixture was filtered to a degree as appropriate. The physical properties of each formulated ink composition was tested and each was determined to be within the required ranges suitable for continuous inkjet inks, particularly for viscosity and solution resistivity as described above.

Example 1

The improved durability and water resistance of the inventive inks was demonstrated by first printing samples with a Videojet® 1510 printer and then performing some standard tests. The printing substrate in this case was a commercially available LLDPE garbage bag. Comparative Example 1 was a commercially available CIJ ink from Videojet (16-8470), which is an ink typically used for printing date and lot codes with good adhesion on plastic films. Examples 1 and 2 were inventive ink compositions of the formulas set forth in Table 1 below.

TABLE 1

|  | Example 1 | Example 2 |
|---|---|---|
| Methyl ethyl ketone | 85.2 | 76.4 |
| Super Ester A-75 |  | 16.6 |
| DC-233 | 6.8 |  |
| CAP 482-0.5 | 2.5 | 2 |
| Paraloid B-72 | 2.5 | 2 |
| Millijet Blue 28 | 2.3 | 2.3 |
| TBAPF$_6$ | 0.7 | 0.7 |
| Total (weight percentage) | 100.0 | 100.0 |

Ingredients: TBAPF$_6$ is tetrabutylammonium hexalfuorophosphate from GFS Chemical; Superester A-75 is a rosin ester from Arakawa Chemical; DC-233 is a silicone flake resin available from Dow Corning; CAP 482-0.5 is a cellulose acetate from Eastman Chemical; Paraloid B-72 is a methyl methacrylate copolymer from Dow Chemical; and Millijet Blue 28 is from Milliken Chemical.

A rub resistance test was performed wherein the printed marks were subjected to 10 hard thumb rubs across the printed images. Scratch resistance was performed similarly and based on 10 fingernail scratches across the printed images. A wet transfer test was performed by spraying the printed samples with Formula 409™ and then applying a 1 kg weight to the print images pressed against a PVC flooring tile (a white uncoated vinyl tile available from Armstrong flooring) at room temperature for a period of about 12 hours. After transfer, an attempt was made to clean the ink transferred to the PVC surface by wiping 10 times with a dry paper towel. Ratings provided describe the percentages of the printed image removed from the film, percentages transferred to the PVC transfer layer and the percentages remaining on the PVC transfer layer after attempting to clean them. The durability test results are set forth in Table 2.

TABLE 2

|  | Example 1 | Example 2 | Comparative Example 1 (Videojet 16-8470) |
|---|---|---|---|
| Rub Resistance, % removed | 0 | 0 | 60 |
| Scratch Resistance, % removed | 20 | 0 | 60 |
| Wet transfer, % transfer | 20 | 40 | 20 |
| Post-transfer cleanability (dry wipe), % remaining | 0 | 0 | 20 |

Figure 2A:
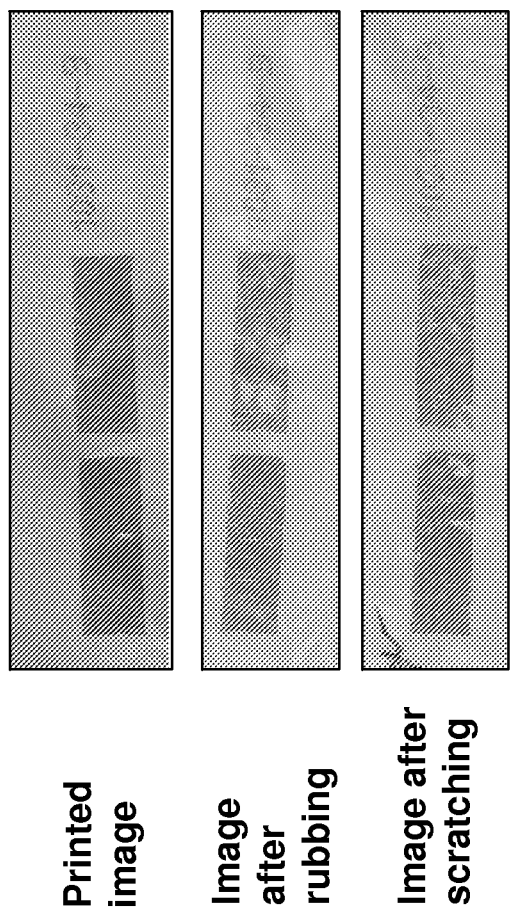
FIG. 2A shows CIJ printed images for Example 1 before and after abrasion testing.
Figure 2B:
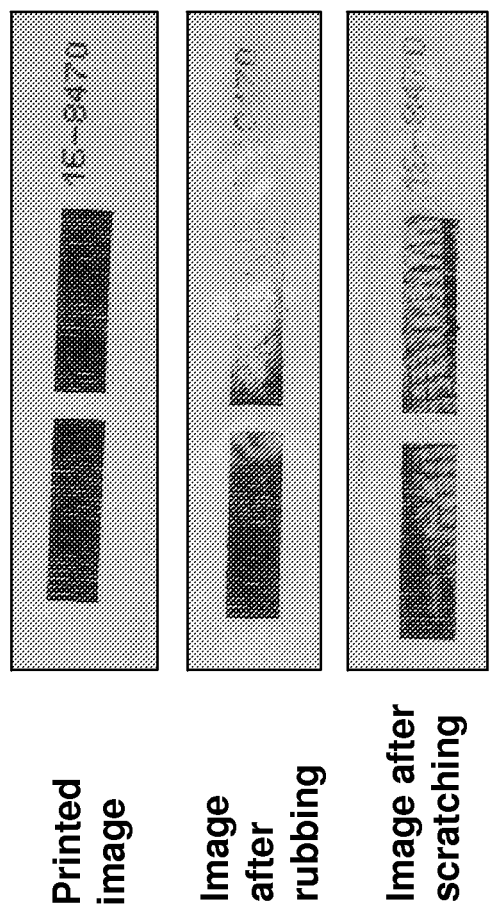
FIG. 2B shows a CIJ printed images for Comparative Example 1 before and after abrasion testing.

It can be seen in Table 2 that the ink compositions of Examples 1 and 2 had better scratch resistance and much better rub resistance as compared to Comparative Example 1. FIGS. 2A and 2B provide the post-test visual comparison between Example 1 and Comparative Example 1. Without being bound to theory, it is believed that the polysiloxane/rosin primary polymers of the Examples in combination with other binders provide good adhesion and abrasion resistance on flexible films.

FIGS. 3A, 3B, and 3C show CIJ printed images and the transfer layer after transfer testing for Example 1, Comparative Example 1, and Comparative Example 2, respectively. As shown in FIG. 3A, the prescribed water soluble Milliken dyes prevent the printed inks from penetrating and thus transferring into the PVC surface. This is in contrast to solvent based dyes that are typically used in solvent based ink jet inks as is the case with Comparative Example 1. FIG. 3B shows that for Comparative Example 1, a ghost image remains adhered to the PVC transfer layer even after cleaning. Comparative Example 2 as shown in FIG. 3C was a pigmented printed mark that was found already printed on the store-purchased bags. These marks are typically stamped onto the surface by a roller-type stamp. Comparing FIG. 3A with FIG. 3C, one can see that the degree of transfer and removability for the inventive ink is similar to what is being used commercially on bags today.

Example 2

Other ink compositions were tested for untreated adhesion onto the garbage bags. These various combinations are set forth in Table 3. As is shown in Table 3, various inks formulated with acetone as the primary solvent also achieved acceptable rub and scratch resistance—i.e., no removal. Combinations of primary binder rosin ester or acrylics and cellulose esters as secondary resins were particularly suitable.

TABLE 3

|  |  | EXAMPLES |  |  |  |  |  |  |  |
|---|---|---|---|---|---|---|---|---|---|
|  |  | 3 | 4 | 5 | 6 | 7 | 8 | 9 | 10 |
| Sol-vents | Acetone | 81.6 | 66.3 | 67.1 | 63.4 | 63.6 | 69.1 | 65.6 | 69.6 |
|  | Ethanol, SDA 23A | 9.0 | 10.0 | 9.0 | 9.6 | 9.6 | 9.0 | 9.0 |  |
|  | Glycol |  |  |  |  |  |  |  | 9.6 |
|  | PMA |  |  |  |  |  |  |  |  |
|  | DI water |  |  |  |  |  |  |  | 1.0 |

TABLE 3-continued

| | | EXAMPLES | | | | | | | |
|---|---|---|---|---|---|---|---|---|---|
| | | 3 | 4 | 5 | 6 | 7 | 8 | 9 | 10 |
| Polymer 1 | Superester A-75 | | | 16.6 | 16.9 | 16.9 | 16.0 | 16.0 | |
| | DC-233 | | 16.6 | | | | | | |
| Polymer 2 | CAP 482-0.5 | 3.5 | 2.2 | 2.3 | | | | 3.5 | |
| | CAB 553-0.04 | | | | | | 3.6 | | |
| | CAB 551-0.01 | | | | 3.7 | | | | 10.0 |
| | Paraloid B-72 | 3.5 | 2.2 | 2.3 | 3.7 | 3.6 | | 7.0 | |
| | Paraloid DM-55 | | | | | | | | 4.8 |
| Dye | Millijet Blue 28 | 2.0 | 2.3 | 2.3 | 2.3 | 2.3 | 2.0 | 2.0 | |
| | Millijet Red 17 | | | | | | | | 4.5 |
| | Millijet Yellow 26 | | | | | | | | 0.5 |
| Salt | FC122 | 0.4 | 0.4 | 0.4 | 0.5 | 0.5 | 0.4 | 0.4 | |
| | KSCN | | | | | | | | 0.3 |
| | Total | 100.0 | 100.0 | 100.0 | 100.0 | 100.0 | 100.0 | 100.0 | 100.0 |
| | Rub Resistance | 5 | 4 | 5 | 5 | 5 | 3 | 4 | 5 |
| | Scratch Resistance | 5 | 2 | 5 | 5 | 5 | 3 | 4 | 5 |

{Table 4 scale: 1= worst; 5 = best (no removal).}
INGREDIENTS: SDA23A is denature ethanol from Ashland Chemical; Glycol PMA is methoxypropylacetate from Ashland Chemical; CAB 553-0.04 and CAB 551-0.01 are cellulose esters from Eastman, Chemical; Paraloid DM-55 is and acrylic resin from Dow Chemical; Millijet Red 17 and Yellow 26 are from Milliken Chemical; FC122 is lithium triflate from 3M, Inc.; and, KSCN is potassium thiocyanate from Ashland Chemical.

Example 3

Figure 4A:
FIG. 4A shows an image printed with a binary array printer.
Figure 4B:
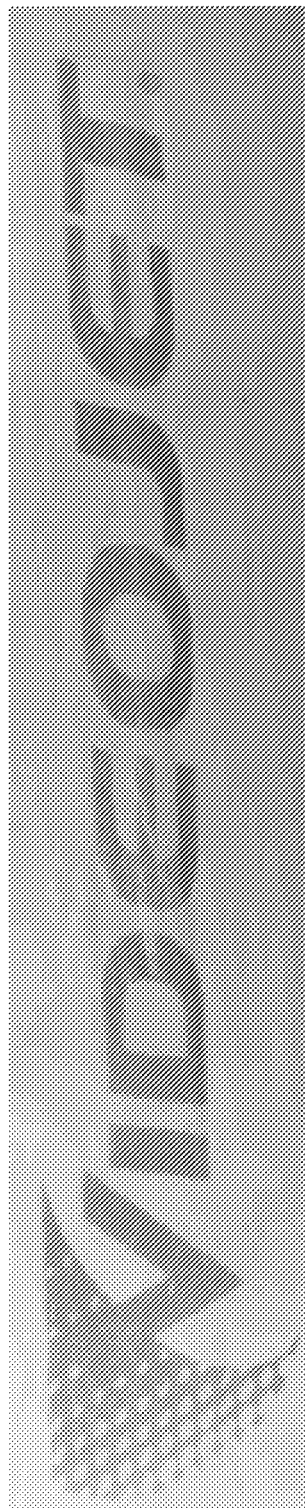
FIG. 4B shows the image of FIG. 4A after testing with a crock meter.

The CIJ inks of Example 2 and Example 10 were printed using a binary array Videojet BX6600™ series printer. The print quality obtained was very good and the images retained the same level of durability as they had when printed with the single nozzle CIJ printer as described in previous examples. An example of an image printed by this method is provided in FIG. 4A. To re-test the level of durability achieved, print samples with the ink composition of Example 2 were stored on a shelf for nearly 10 months and then re-tested by rubbing and scratching. Up to 50 rubs and scratches were performed and some substrate distortion occurred; however no significant ink removal was noted. The samples were further crumpled together in a tight wad by hand and retested. No additional ink removal was noted after stressing the samples in this way. Finally, a test similar to an industry standard crock test was performed using a linear crock meter (Crockmaster model available from James H. Heal and Company). The supplemental weight of the crock meter was removed from the apparatus and, before testing, the printed substrate was secured to the crock meter base using tape. The image was subject to 50 rubs using a cotton cloth with this method and showed little to no visual change in the appearance of the printed image, as depicted in FIG. 4B. Based on these tests, it was deemed that this ink was essentially permanent on the garbage bag.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for printing images on a substrate with an ink jet printer comprising:
    providing a liquid ink composition comprising:
        an organic solvent;
        a binder, wherein the binder comprises a first thermoplastic polymer and a second thermoplastic polymer; and
        a colorant;
    providing a substrate, wherein the substrate is a plastic film;
    directing droplets of the ink jet ink composition to the substrate;
    allowing the droplets to dry, thereby printing a durable graphic image on the substrate, wherein the ink jet printer is a binary array printer; and
    forming the substrate into a bag.

2. The method of claim 1 wherein the graphic image has a durability such that there is no visible degradation in appearance of the graphic image after performing 25 rubs using a crock meter.

3. The method of claim 1 wherein the graphic image has a durability such that when the graphic image is subjected to thumb rubs, the force or the number of thumb rubs will first cause damage to the plastic film prior to causing visible print quality degradation as a result of ink removal.

4. The method of claim 1 wherein the ink jet printer is integrated on-line with a production process for a manufactured article comprising the plastic film.

5. The method of claim 1 wherein the organic solvent comprises methyl ethyl ketone or acetone.

6. The method of claim 1 wherein the first thermoplastic polymer is selected from polysiloxanes, acrylics, rosin esters, and mixtures thereof.

7. The method of claim 1 wherein the second thermoplastic polymer is selected from acrylics, cellulose esters, nitrocellulose, vinyl acetate/vinyl chloride copolymers, and mixtures thereof.

8. The method of claim 1 wherein the colorant comprises a dye with solubility in 100% methyl ethyl ketone greater than 5 grams per liter.

9. The method of claim 8 wherein the dye is soluble in or miscible with water to more than 2 grams per liter.

10. The method of claim 1 wherein the substrate moves with respect to the ink jet printer at a speed of at least 500 meters/min.

11. The method of claim 1 wherein the substrate comprises a polymer material selected from polyethylene, low density polyethylene, linear low density polyethylene, very low density polyethylene, polypropylene, biaxially oriented polypropylene, and nylon.

12. The method of claim 1 wherein the bag is a disposable bag.

13. The method of claim 1 wherein the bag is a trash bag.

14. The method of claim 1 wherein the graphic image is a logo.

15. The method of claim 1 wherein the graphic image is a decorative image.

16. The method of claim 1 wherein the method does not include any treatment of the printed graphic image after printing to dry or cure the ink composition.

17. The method of claim 1 wherein the ink composition has an unassisted dry time of less than 4 seconds on the substrate.

18. The method of claim 1 wherein the method does not include any treatment of the plastic film before printing to enhance the adhesion of the ink composition.

* * * * *